United States Patent
Sielagoski et al.

(10) Patent No.: US 6,604,043 B2
(45) Date of Patent: *Aug. 5, 2003

(54) METHOD AND SYSTEM FOR CONTROLLING VEHICLE DECELERATION IN AN ADAPTIVE SPEED CONTROL SYSTEM BASED ON VEHICLE SPEED

(75) Inventors: Gerald L. Sielagoski, St. Clair Shores, MI (US); Mark Peter Friedrich, Clinton Township, MI (US); Sam G. Rahaim, Ann Arbor, MI (US)

(73) Assignee: Visteon Global Technologies, Inc., Dearborn, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/995,286

(22) Filed: Nov. 26, 2001

(65) Prior Publication Data

US 2002/0038176 A1 Mar. 28, 2002

Related U.S. Application Data

(63) Continuation of application No. 09/867,824, filed on May 30, 2001, which is a continuation of application No. 09/470,365, filed on Dec. 22, 1999, now Pat. No. 6,285,945.

(51) Int. Cl.[7] ............................. G06F 15/50; B60T 7/12
(52) U.S. Cl. ............................ 701/96; 701/93; 180/170
(58) Field of Search ..................... 701/96, 93; 180/170; 303/121, 122.05

(56) References Cited

U.S. PATENT DOCUMENTS

| | | | |
|---|---|---|---|
| 4,998,593 A | 3/1991 | Karnopp et al. | |
| 5,280,432 A | 1/1994 | Kuwana et al. | |
| 5,423,601 A | 6/1995 | Sigl | |
| 5,467,283 A | 11/1995 | Butsuen et al. | |
| 5,508,925 A | 4/1996 | Katayama et al. | |
| 5,556,176 A | 9/1996 | Bosch et al. | |
| 5,835,878 A | * 11/1998 | Saito et al. | 123/361 |
| 5,878,361 A | 3/1999 | Sekine et al. | |
| 5,931,546 A | * 8/1999 | Nakashima et al. | 303/122.05 |
| 5,964,822 A | 10/1999 | Alland et al. | |
| 6,070,952 A | 6/2000 | Tozu et al. | |
| 6,112,147 A | 8/2000 | Ghoneim et al. | |
| 6,122,561 A | 9/2000 | Chandler et al. | |
| 6,128,569 A | 10/2000 | Fukushima | |
| 6,138,071 A | 10/2000 | Sekine et al. | |
| 6,139,120 A | * 10/2000 | Fukada | 180/197 |
| 6,141,617 A | * 10/2000 | Matsuda et al. | 340/438 |
| 6,178,370 B1 | * 1/2001 | Zierolf | 188/181 A |
| 6,188,949 B1 | 2/2001 | Hahn et al. | |
| 6,212,465 B1 | * 4/2001 | Sielagoski et al. | 180/170 |
| 6,285,945 B1 | * 9/2001 | Sielagoski et al. | 180/170 |

* cited by examiner

Primary Examiner—William A. Cuchlinski, Jr.
Assistant Examiner—Olga Hernandez
(74) Attorney, Agent, or Firm—John E. Kajander

(57) ABSTRACT

In an adaptive speed control system for a vehicle, a method and system for controlling vehicle deceleration are provided. The method includes determining a speed of the vehicle, and setting a maximum allowed vehicle deceleration based on the vehicle speed determined. The system includes a receiver capable of receiving an input signal indicative of a speed of the vehicle, and a controller capable of setting a maximum allowed vehicle deceleration based on the vehicle speed.

10 Claims, 2 Drawing Sheets

METHOD AND SYSTEM FOR CONTROLLING VEHICLE DECELERATION IN AN ADAPTIVE SPEED CONTROL SYSTEM BASED ON VEHICLE SPEED

This application is a continuation of co-pending U.S. patent application Ser. No. 09/867,824, filed May 30, 2001, which in turn is a continuation of U.S. patent application Ser. No. 09/470,365 filed on Dec. 22, 1999, now U.S. Pat. No. 6,285,945.

TECHNICAL FIELD

This invention relates to a method and system for controlling a maximum allowed vehicle deceleration in an adaptive speed control system based on vehicle speed.

BACKGROUND ART

Adaptive Cruise (i.e., speed) Control (ACC) systems operate much like conventional Cruise Control systems, with the added capability of being able to sense in-path vehicles and to slow the ACC equipped vehicle in response. An ACC equipped vehicle thereby allows its operator to automatically control the vehicle speed, as with conventional Cruise Control, without the necessity of having to deactivate and reactivate control whenever slower traffic is encountered.

As is well known in the art, existing ACC methods and systems use a forward looking range sensor such as radar to sense an in-path vehicle (which may also be referred to as a sensed target or primary target). Based on the radar sensor information, such ACC methods and systems then determine the range and relative velocity (or range rate) of the sensed in-path vehicle. Using the range and range rate, the speed of the ACC equipped vehicle is controlled to maintain a selected following interval between the ACC equipped vehicle and the sensed in-path vehicle. The speed of the ACC equipped vehicle is typically controlled by automatic control of the vehicle throttle actuator. In more advanced ACC methods and systems, vehicle speed may also be controlled by automatic control of vehicle brake actuators. Such ACC methods and systems have the ability to apply a moderate degree of braking to the vehicle to achieve further vehicle deceleration (i.e., in addition to vehicle deceleration achieved via throttle control) in response to an in-path vehicle.

Thus, in maintaining the selected following interval, existing ACC methods and systems may decelerate the ACC equipped vehicle. In such situations, the deceleration the ACC equipped vehicle may take any value up to a maximum allowed deceleration, which is typically 0.3 g. In existing ACC methods and systems, however, such a maximum allowed deceleration is constant, regardless of vehicle speed. As a result, at higher vehicle speeds, deceleration of the ACC equipped vehicle at the maximum allowed deceleration may be perceived as uncomfortable by the vehicle operator. Conversely, at lower vehicle speeds, deceleration of the ACC equipped vehicle at that same maximum allowed deceleration may be perceived as insufficient by the vehicle operator.

As a result, there exists a need in an ACC system for a method and system for controlling the maximum allowed vehicle deceleration based on the vehicle speed. More specifically, such a method and system would set the maximum allowed vehicle deceleration as a function of the vehicle speed, increasing the maximum allowed vehicle deceleration at lower vehicle speeds and decreasing the maximum allowed vehicle deceleration at higher vehicle speeds. Such a method and system would thereby provide the ACC equipped vehicle with a more comfortable response for the vehicle operator.

DISCLOSURE OF INVENTION

Accordingly, it is a principal object of the present invention to provide, in a vehicle equipped with an adaptive speed control system, a method and system for controlling the maximum allowed vehicle deceleration based on the speed of the vehicle.

According to the present invention, then, in an adaptive speed control system for a vehicle, a method is provided for controlling vehicle deceleration. The method comprises determining a speed of the vehicle, and setting a maximum allowed vehicle deceleration based on the vehicle speed determined.

Similarly, in an adaptive speed control system for a vehicle, a system is also provided for controlling vehicle deceleration. The system comprises a receiver capable of receiving an input signal indicative of the speed of the vehicle, and a controller capable of setting a maximum allowed vehicle deceleration based on the vehicle speed.

These and other objects, features and advantages of the present invention will be readily apparent upon consideration of the following detailed description of the invention in conjunction with the accompanying drawings.

BEST MODE FOR CARRYING OUT THE INVENTION

Figure 1:
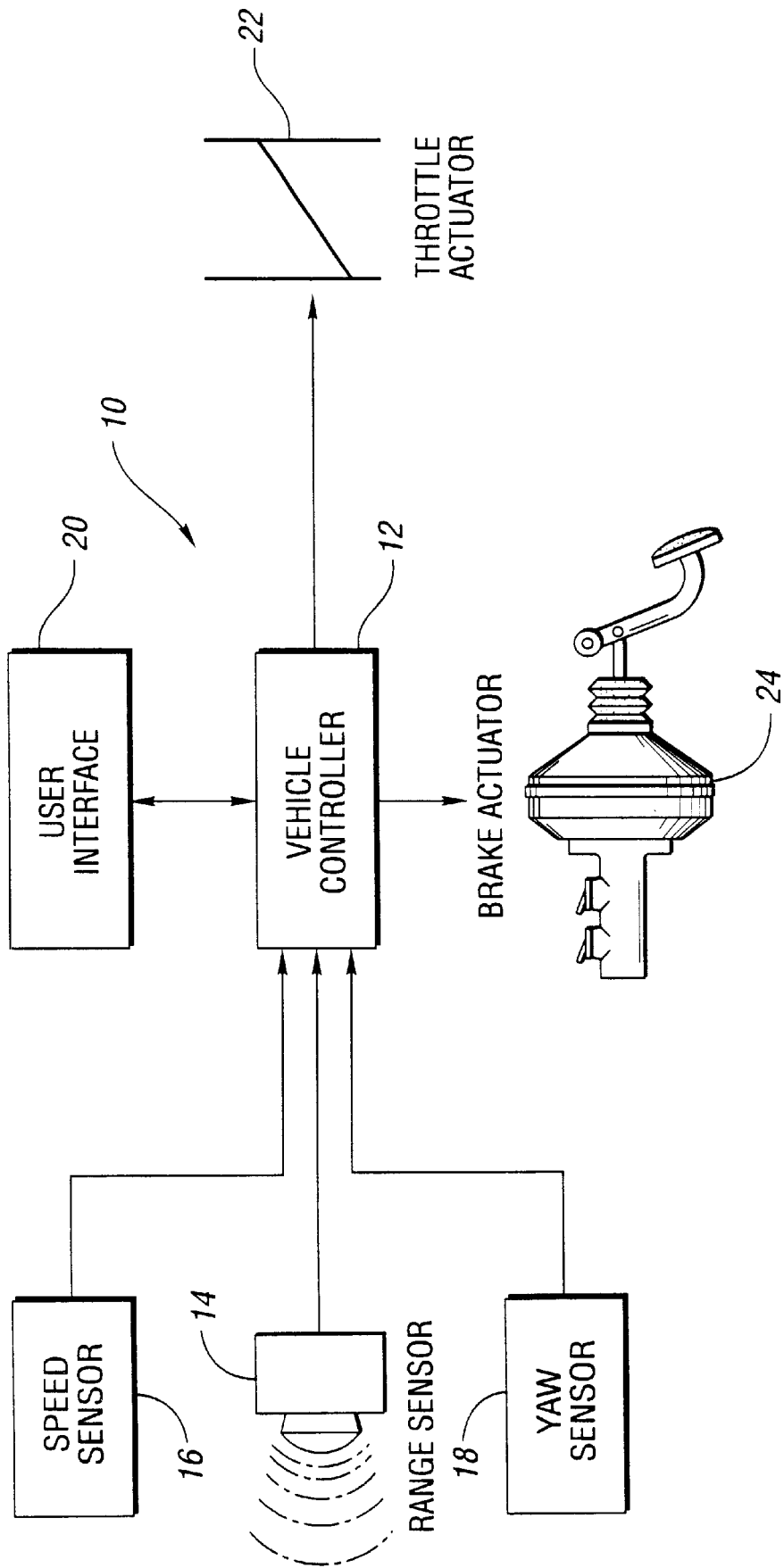
FIG. 1 is a simplified block diagram of an adaptive cruise control system, including the system of the present invention.

Referring to FIGS. 1–4, the preferred embodiment of the method and system of the present invention will now be described. In that regard, FIG. 1 illustrates a simplified block diagram of an Adaptive Cruise Control (ACC) system, including the system of the present invention, denoted generally by reference numeral 10.

In general, as is well known to those of ordinary skill in the art, ACC system (10) is a closed loop control system intended to respond to potential targets in front of and in the same lane of traffic as the vehicle equipped with the ACC system (10). The goal of ACC system (10) is to partially automate the continuous longitudinal control of the vehicle, thereby providing the vehicle operator with improved comfort and convenience. In that regard, ACC system (10) may operate in either a normal or a following mode. In normal mode operation, ACC system (10) controls the speed of the ACC equipped vehicle to the speed set by the vehicle operator as the control speed. In following mode operation, ACC system (10) controls the speed of the ACC equipped vehicle to the speed of a sensed in-path vehicle (which may be referred to as a sensed target or a primary target).

More specifically, as seen in FIG. 1, the ACC system (10) includes a vehicle controller (12) provided in communication with a range sensor (14), a speed sensor (16), a yaw rate sensor (18), a user interface (20), a throttle actuator (22), and a brake actuator (24). As previously described, the system (10) extends the function of conventional speed control systems. In that regard, based on range and relative velocity information obtained and/or derived from forward looking range sensor (14) and speed sensor (16), vehicle controller (12) uses throttle and brake actuators (22, 24) to control the speed of the ACC equipped vehicle in order to maintain a selected following interval (in seconds) between the ACC equipped vehicle and a sensed target (i.e., a lead vehicle) in the forward path of travel of the ACC equipped vehicle.

The following interval between the ACC equipped vehicle and the sensed target is initially set at a default value (typically two seconds) upon activation of the system (10), but may be modified by the vehicle operator to a number of other selectable values (typically a value greater than or equal to one second, but less than or equal to two seconds) via user interface (20). The default following interval is typically the maximum following interval allowed, and modification of the following interval by the vehicle operator is permitted between that maximum and a defined minimum following interval (typically one second). The following interval is referred to as headway, and is defined as the range to the sensed target (in meters), divided by the speed of the ACC equipped vehicle (in meters per second). User interface (20) is also used by the vehicle operator to set the desired vehicle control speed.

As previously noted, ACC systems and methods are well known in the art. As a result, a detailed description of the general operation of ACC system (10), including such functions as acquisition, discrimination, differentiation, selection and tracking of targets, range and relative velocity (range rate) determinations, sensor operations, and throttle and brake control is unnecessary and, for the sake of brevity, is not set forth herein. In connection with the method and system of the present invention, such functions of ACC system (10) may be undertaken in any fashion known to those of ordinary skill.

Figure 2:
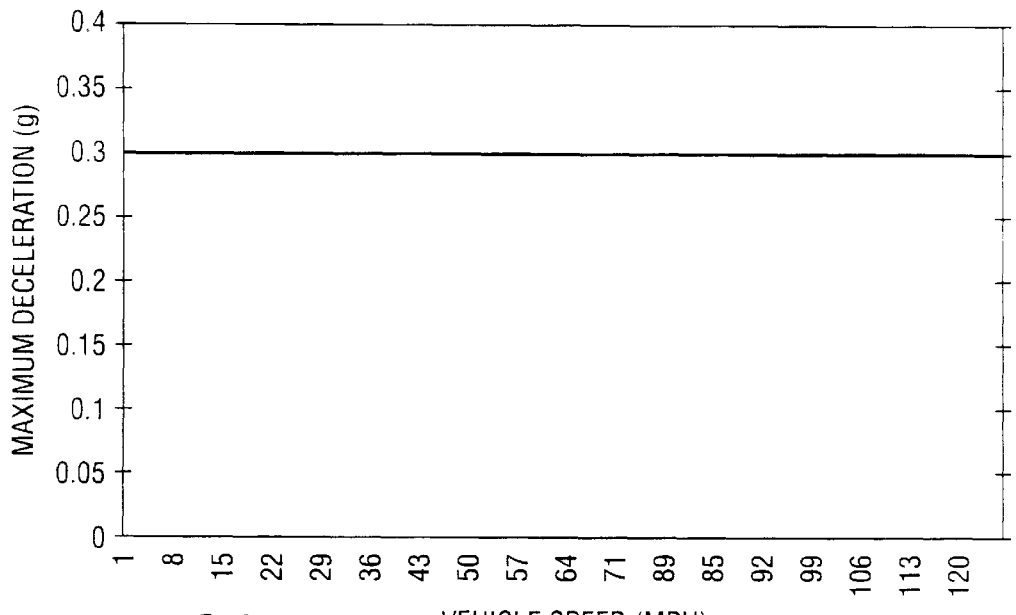
FIG. 2 is a graph of maximum allowed vehicle deceleration over a range of vehicle speeds according to the prior art in a vehicle equipped with an adaptive speed control system.

As also previously noted, while maintaining the selected following interval, existing ACC methods and systems may decelerate the ACC equipped vehicle. In such situations, the deceleration the ACC equipped vehicle may take any value up to a maximum allowed deceleration, which is typically 0.3 g. In existing ACC methods and systems, however, such a maximum allowed deceleration is constant, regardless of vehicle speed. In that regard, FIG. 2 is a graphical representation of an example of a maximum allowed vehicle deceleration according to the prior art in an ACC equipped vehicle. As seen therein, the maximum allowed vehicle deceleration is 0.3 g, and remains constant over the entire range of possible vehicle speeds.

In that regard, the same constant braking force on a vehicle, in terms of a vehicle deceleration, is perceived by a vehicle operator as much higher, and therefore less comfortable, at higher vehicle speeds than at lower vehicle speeds. Thus, at higher vehicle speeds, deceleration of the ACC equipped vehicle at the maximum allowed deceleration may be perceived as uncomfortable by the vehicle operator. Conversely, at lower vehicle speeds, deceleration of the ACC equipped vehicle at that same maximum allowed deceleration may be perceived as insufficient by the vehicle operator.

In contrast, the present invention provides, in the ACC system (10) of FIG. 1, a method and system for controlling the maximum allowed vehicle deceleration based on the vehicle speed. More specifically, the present invention sets the maximum allowed vehicle deceleration as a function of the vehicle speed, increasing the maximum allowed vehicle deceleration at lower vehicle speeds and decreasing the maximum allowed vehicle deceleration at higher vehicle speeds. In such a fashion, the present invention provides the ACC equipped vehicle with a more comfortable response for the vehicle operator.

Figure 3:
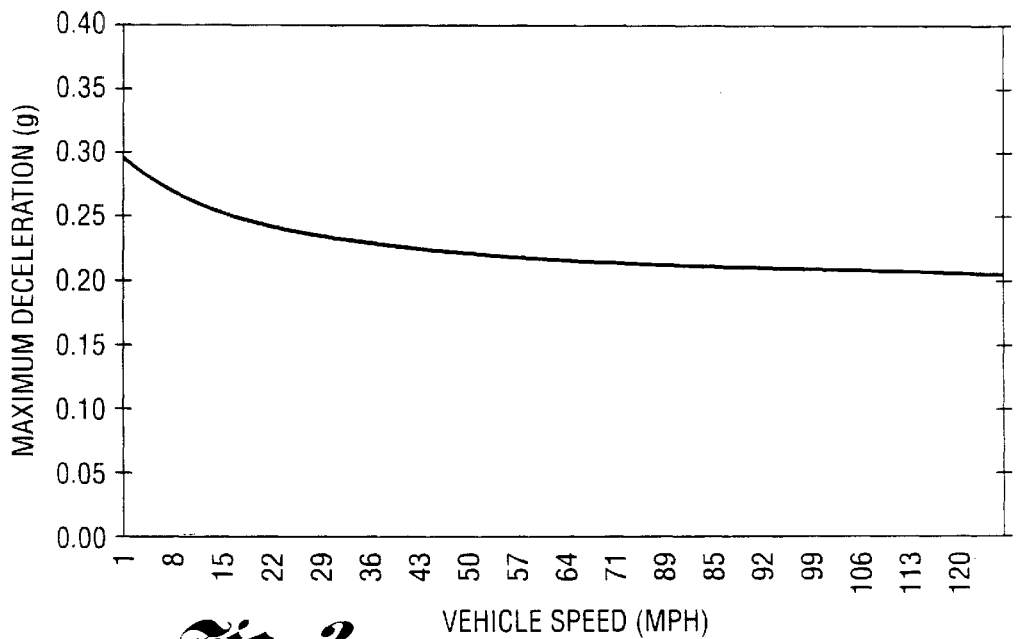
FIG. 3 is a graph of maximum allowed vehicle deceleration as a function of vehicle speed according to the method and system of the present invention in a vehicle equipped with an adaptive speed control system.

In that regard, FIG. 3 is a graphical representation of a preferred example of a maximum allowed vehicle deceleration according to the present invention in an ACC equipped vehicle. As seen therein, at low vehicle speeds, such as approximately 10 miles per hour or less, the maximum allowed vehicle deceleration is approximately 0.3 g, the maximum vehicle deceleration typically employed in prior art ACC methods and systems. However, as the speed of the ACC equipped vehicle increase, the maximum vehicle deceleration allowed decreases to a minimum of approximately 0.2 g at higher vehicle speeds such as approximately 100 miles per hour or greater. As those of ordinary skill will appreciate, the preferred maximum allowed vehicle deceleration shown in FIG. 3 is an exponential function of the vehicle speed. More specifically, the preferred maximum allowed vehicle deceleration according to the present invention may be defined by the equation:

$$\text{MAXDECEL} = 0.2 + 160/(\text{VEHSPD} + 40)^2, \quad (1)$$

where MAXDECEL is the maximum allowed vehicle deceleration, and VEHSPD is the vehicle speed.

Referring again to FIG. 1, the system of the present invention is preferably included in vehicle controller (12). In that regard, vehicle controller (12) includes a receiver (not shown) capable of receiving an input signal from speed sensor (16) indicative of the speed of the ACC equipped vehicle. Vehicle controller (12) also includes a controller (not shown) capable of setting a maximum allowed vehicle deceleration based on the vehicle speed. It should be noted here that the controller (as well as vehicle controller (12) of ACC system (10)) may take the form of an appropriately programmed microprocessor, or any equivalent thereof.

In that regard, to set a maximum allowed vehicle deceleration based on the vehicle speed, the controller is capable of adjusting the maximum allowed vehicle deceleration in an inverse relationship to the vehicle speed. More specifically, the controller is capable of decreasing the maximum allowed vehicle deceleration as the vehicle speed increases, and of increasing the maximum allowed vehicle deceleration as the vehicle speed decreases.

According to the system of the present invention, the maximum allowed vehicle deceleration is preferably capable of varying continuously. As previously noted, the maximum allowed vehicle deceleration is preferably defined as an exponential function of the vehicle speed, as in equation (1) above. However, the maximum allowed vehicle deceleration may be defined as any of a number of other inverse functions of the vehicle speed, such as linear, where the maximum allowed vehicle speed generally decreases as the vehicle speed generally increases, and generally increases as the vehicle speed generally decreases. Regardless of the function employed, the maximum allowed vehicle deceleration preferably varies between approximately 0.2 g at lower vehicle speeds and approximately 0.3 g at higher vehicle speeds.

Figure 4:
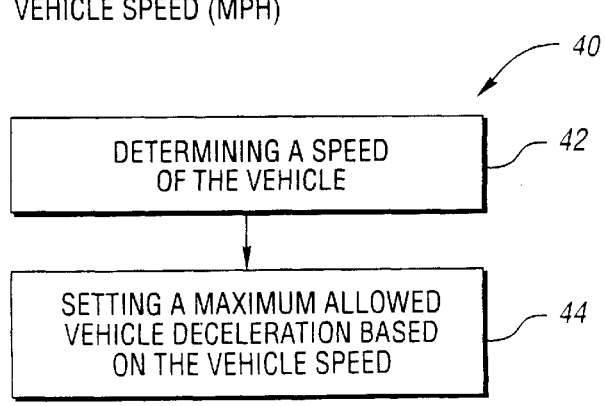
FIG. 4 is a flowchart of the method of the present invention.

Referring now to FIG. 4, a flowchart of the method of the present invention is shown, denoted generally by reference numeral 40. As seen therein, the method (40) of the present invention comprises determining (42) a speed of the vehicle, and setting (44) a maximum allowed vehicle deceleration based on the vehicle speed determined. In that regard, as described above in connection with the system of the present invention, setting (44) a maximum allowed vehicle deceleration based on the vehicle speed includes adjusting the maximum allowed vehicle deceleration in an inverse relationship to the vehicle speed, including decreasing the maximum allowed vehicle deceleration as the vehicle speed increases, and increasing the maximum allowed vehicle deceleration as the vehicle speed decreases.

As with the system of the present invention, according to the method of the present invention, the maximum allowed vehicle deceleration is preferably capable of varying continuously. Once again, the maximum allowed vehicle deceleration is preferably defined as an exponential function of the vehicle speed, as in equation (1) above, although any of a number of other inverse functions of the vehicle speed may be used where the maximum allowed vehicle speed generally decreases as the vehicle speed generally increases, and generally increases as the vehicle speed generally decreases. As previously noted, regardless of the function employed, the maximum allowed vehicle deceleration preferably varies between approximately 0.2 g at lower vehicle speeds and approximately 0.3 g at higher vehicle speeds.

From the foregoing description, it can be seen that the present invention provides, in an ACC system, a method and system for controlling the maximum allowed vehicle deceleration based on the vehicle speed. More specifically, the present invention sets the maximum allowed vehicle deceleration as a function of the vehicle speed, increasing the maximum allowed vehicle deceleration at lower vehicle speeds and decreasing the maximum allowed vehicle deceleration at higher vehicle speeds. In such a fashion, the present invention provides the ACC equipped vehicle with a more comfortable response for the vehicle operator.

While various embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. In an adaptive speed control system for a vehicle, a method for controlling vehicle deceleration, the method comprising:

determining a speed of the vehicle; and setting a maximum allowed vehicle deceleration based on the vehicle speed determined, wherein setting the maximum allowed vehicle deceleration comprises decreasing the maximum allowed vehicle deceleration as the vehicle speed increases.

2. In an adaptive speed control system for a vehicle, a method for controlling vehicle deceleration, the method comprising:

determining a speed of the vehicle; and setting a maximum allowed vehicle deceleration based on the vehicle speed determined, wherein setting the maximum allowed vehicle deceleration comprises increasing the maximum allowed vehicle deceleration as the vehicle speed decreases.

3. In an adaptive speed control system for a vehicle, a method for controlling vehicle deceleration, the method comprising:

determining a speed of the vehicle; and setting a maximum allowed vehicle deceleration based on the vehicle speed determined, wherein the maximum allowed vehicle deceleration varies in a range between about 0.2 g and 0.3 g.

4. In an adaptive speed control system for a vehicle, a method for controlling vehicle deceleration, the method comprising:

determining a speed of the vehicle; and setting a maximum allowed vehicle deceleration based on the vehicle speed determined, wherein the maximum allowed vehicle deceleration is an exponential function of the vehicle speed.

5. The method of claim 4 wherein the maximum allowed vehicle deceleration is defined by the equation:

$$MAXDECEL=0.2+160/(VEHSPD+40)^2,$$

where MAXDECEL is the maximum allowed vehicle deceleration, and VEHSPD is the vehicle speed.

6. In an adaptive speed control system for a vehicle, a system for controlling vehicle deceleration, the system comprising:

a receiver for receiving an input signal indicative of a speed of the vehicle; and a controller for setting a maximum allowed vehicle deceleration based on the vehicle speed, wherein, to set the maximum allowed vehicle deceleration, the controller is operative to decrease the maximum allowed vehicle deceleration as the vehicle speed increases.

7. In an adaptive speed control system for a vehicle, a system for controlling vehicle deceleration, the system comprising:

a receiver for receiving an input signal indicative of a speed of the vehicle; and a controller for setting a maximum allowed vehicle deceleration based on the vehicle speed, wherein, to set the maximum allowed vehicle deceleration, the controller is operative to increase the maximum allowed vehicle deceleration as the vehicle speed decreases.

8. In an adaptive speed control system for a vehicle, a system for controlling vehicle deceleration, the system comprising:

a receiver for receiving an input signal indicative of a speed of the vehicle; and a controller for setting a maximum allowed vehicle deceleration based on the vehicle speed, wherein the maximum allowed vehicle deceleration varies in a range between about 0.2 g and 0.3 g.

9. In an adaptive speed control system for a vehicle, a system for controlling vehicle deceleration, the system comprising:

a receiver for receiving an input signal indicative of a speed of the vehicle; and a controller for setting a maximum allowed vehicle deceleration based on the vehicle speed, wherein the maximum allowed vehicle deceleration is an exponential function of the vehicle speed.

10. The system of claim 9 wherein the maximum allowed vehicle deceleration is defined by the equation:

$$MAXDECEL=0.2+160/(VEHSPD+40)^2,$$

where MAXDECEL is the maximum allowed vehicle deceleration, and VEHSPD is the vehicle speed.

* * * * *

(12) INTER PARTES REEXAMINATION CERTIFICATE (512th)
United States Patent
Sielagoski et al.

(10) Number: US 6,604,043 C1
(45) Certificate Issued: *Jan. 16, 2013

(54) METHOD AND SYSTEM FOR CONTROLLING VEHICLE DECELERATION IN AN ADAPTIVE SPEED CONTROL SYSTEM BASED ON VEHICLE SPEED

(75) Inventors: Gerald L. Sielagoski, St. Clair Shores, MI (US); Mark Peter Friedrich, Clinton Township, MI (US); Sam G. Rahalm, Ann Arbor, MI (US)

(73) Assignee: Visteon Global Technologies, Inc., Van Buren Township, MI (US)

Reexamination Request:
No. 95/001,634, May 4, 2011

Reexamination Certificate for:
Patent No.: 6,604,043
Issued: Aug. 5, 2003
Appl. No.: 09/995,286
Filed: Nov. 26, 2001

( * ) Notice: This patent is subject to a terminal disclaimer.

Related U.S. Application Data

(63) Continuation of application No. 09/867,824, filed on May 30, 2001, now Pat. No. 6,393,352, which is a continuation of application No. 09/470,365, filed on Dec. 22, 1999, now Pat. No. 6,285,945.

(51) Int. Cl.
*B60K 31/00* (2006.01)
*B60T 7/12* (2006.01)
(52) U.S. Cl. ............................ 701/96; 180/170; 701/93
(58) Field of Classification Search ....................... None
See application file for complete search history.

(56) References Cited

To view the complete listing of prior art documents cited during the proceeding for Reexamination Control Number 95/001,634, please refer to the USPTO's public Patent Application Information Retrieval (PAIR) system under the Display References tab.

*Primary Examiner* — Peter C. English

(57) ABSTRACT

In an adaptive speed control system for a vehicle, a method and system for controlling vehicle deceleration are provided. The method includes determining a speed of the vehicle, and setting a maximum allowed vehicle deceleration based on the vehicle speed determined. The system includes a receiver capable of receiving an input signal indicative of a speed of the vehicle, and a controller capable of setting a maximum allowed vehicle deceleration based on the vehicle speed.

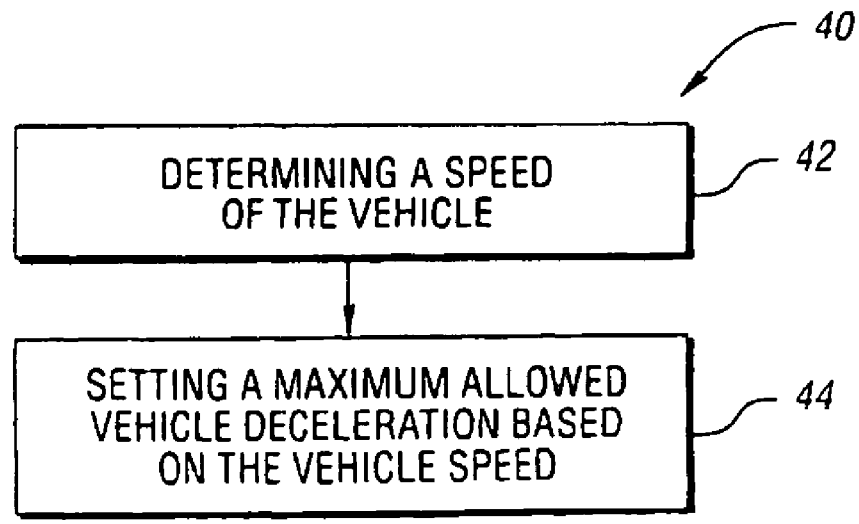

INTER PARTES REEXAMINATION CERTIFICATE ISSUED UNDER 35 U.S.C. 316

THE PATENT IS HEREBY AMENDED AS INDICATED BELOW.

AS A RESULT OF REEXAMINATION, IT HAS BEEN DETERMINED THAT:

Claims 1-10 are cancelled.

* * * * *